UNITED STATES PATENT OFFICE.

ARNOLD STEINER, OF BASLE, SWITZERLAND, ASSIGNOR TO CHEMISCHE FABRIK, VORMALS SANDOZ, OF SAME PLACE.

TRIPHENYLMETHANE-BLUE DYE.

SPECIFICATION forming part of Letters Patent No. 603,016, dated April 26, 1898.

Application filed June 29, 1897. Serial No. 642,850. (Specimens.) Patented in France July 4, 1896, No. 257,887, and in England December 30, 1896, No. 30,015.

*To all whom it may concern:*

Be it known that I, ARNOLD STEINER, chemist, residing at Basle, Switzerland, have invented new and useful Improvements in the Manufacture of Triphenylmethane Dyestuffs, of which the following is a specification, and for which there is a patent of Great Britain, No. 30,015, dated December 30, 1896, and a Brevet d'Invention of France, No. 257,887, dated July 4, 1896.

I have found that the alkylated derivatives of beta-naphthylamin—such as methyl or ethyl phenyl-beta-naphthylamin, methyl or ethyl tolyl-beta-naphthylamin, methyl or ethyl xylyl-beta-naphthylamin—and especially of those belonging to the triphenylmethane group, when combined with tetramethyldiamido-benzophenone or with tetraethyldiamido-benzophenone form coloring-matters which dye wool in very pure violet or blue shades and which, owing to the presence of a beta-naphthyl group, possess the valuable property that they can be converted into sulfonic-acid compounds by treatment with fuming sulfuric acid, which compounds are distinguished by the purity of their shades and their fastness to alkalies. The said derivatives may be easily obtained by the alkylation of phenyl-beta-naphthylamin or of its homologues by the ordinary known method, either by treatment with alkyl-bromid or with a mixture of hydrochloric acid and alcohol. Methylphenyl-beta-naphthylamin crystallizes in large colorless prisms, which melt at 52° centigrade. Ethylphenyl-beta-naphthylamin forms white flakes melting at 55° centigrade.

In carrying out my invention I proceed as follows: Nineteen kilos of methylphenyl-beta-naphthylamin, twenty kilos of tetramethyldiamido-benzophenone, and seven kilos of toluene are mixed in a closed vessel on a water-bath by a suitable agitator. When the mixture has become homogeneous, it is allowed to cool to about 30° centigrade, when 13.5 kilos of phosphorous oxychlorid are added, care being taken to agitate for about thirty minutes until the reaction begins and the temperature rises. The temperature would rise to about 120° centigrade, but is kept down to 70° to 80° centigrade by artificial cooling in the first part of the reaction and raised to this temperature by heating in the second part, the whole time being twelve hours. After cooling the melt is powdered and dissolved in about one thousand liters of hot water. The coloring-matter separates, on the addition of common salt, as a resinous matter having a coppery luster. After drying it can at once be converted into its sulfo compound, or it can be purified by washing with toluene or by solution in weakly-acidulated water and reprecipitation. It then forms a greenish crystalline mass which dyes wool in very pure violet shades.

The new dyestuff is easily soluble in hot weakly-acidulated water and soluble in cold water in only a small degree. If the hot solution is cooled, the solution is solidified in a gelatinous state. It dissolves in ethyl alcohol with a blue-violet shade and in concentrated sulfuric acid with a red-brown shade, which turns into green on adding water, then violet on adding more water, and at last the dyestuff is precipitated as a violet powder. On adding an alkali to the hot solution in water the dyestuff is precipitated as a bluish-gray powder.

The sulfonated dyestuff forms a powder of greenish to coppery shade of a metallic luster, dissolving easily in concentrated sulfuric acid with a red-brown shade, in water and in ethyl alcohol with a violet shade. The watery solution heated with caustic soda turns blue and then almost colorless. Acids precipitate the unchanged dyestuff therefrom. By proceeding in a similar way, but substituting the methylphenyl-beta-naphthylamin by ethylphenyl-beta-naphthylamin in equivalent molecular proportion, similar coloring-matters are produced which dye a slightly-bluer shade.

To produce the sulfonic acids of these coloring-matters, the following process may be employed: Twenty kilos of the crude coloring-matters produced, as hereinbefore described, are finely powdered and dissolved in sixty kilos of concentrated sulfuric acid of one hundred per cent. strength. To this solution there is gradually added, with continued stirring, about forty kilos of fuming sulfuric acid containing fifty-four per cent. of anhydrous sulfuric acid, the temperature being carefully maintained at between 20° and 30° centigrade. As soon as a sample dissolves in a large quantity of hot diluted caustic-soda solution the mixture is poured on ice and the coloring-matter is afterward separated by filtration. The separated matter is then dissolved in about one thousand liters of hot water containing the necessary quantity of caustic soda, the solution is filtered, if necessary, and the coloring-matter is precipitated with common salt and acetic acid. The product, having been dried and ground to powder, forms a blue-violet coloring-matter easily soluble in hot water, which dyes wool a very pure violet of the same shade as "acid violet 7B;" but in distinction from that coloring-matter the new product has the great advantage of being fast to alkalies.

Having now particularly described and ascertained the nature of my said invention and in what manner the same is to be performed, I declare that what I claim is—

1. The process of producing violet to blue dyestuffs consisting in first combining the alkylated derivatives of phenyl-beta-naphthylamin with tetraälkylated diamido-benzophene and afterward sulfonating the so-obtained compound substantially as described.

2. The process of producing violet to blue dyestuffs consisting in first combining the alkylated derivatives of phenyl-beta-naphthylamin with tetraälkylated diamido-benzophenone next adding phosphorous oxychlorid and keeping an elevated temperature and finally sulfonating the obtained compounds substantially as described.

3. The sulfonated blue-violet dyestuff having the constitution of a triphenyl-methane coloring-matter and containing an alkylated derivative of phenyl-beta-naphthylamin, dissolving easily in concentrated sulfuric acid with a red-brown shade and in water and ethyl alcohol with a violet shade and the aqueous solution of which heated with caustic soda turns first blue and then almost colorless and may have the unchanged dyestuff precipitated from it by acids, substantially as herein described.

In testimony whereof I have signed my name to this specification in the presence of two subscribing witnesses.

ARNOLD STEINER.

Witnesses:
MELCHIOR ROÑIGER,
EDUARD SIDLES.